J. C. F. SALOMON.
SADDLETREE.
No. 8,536.  Patented Nov. 18, 1851.
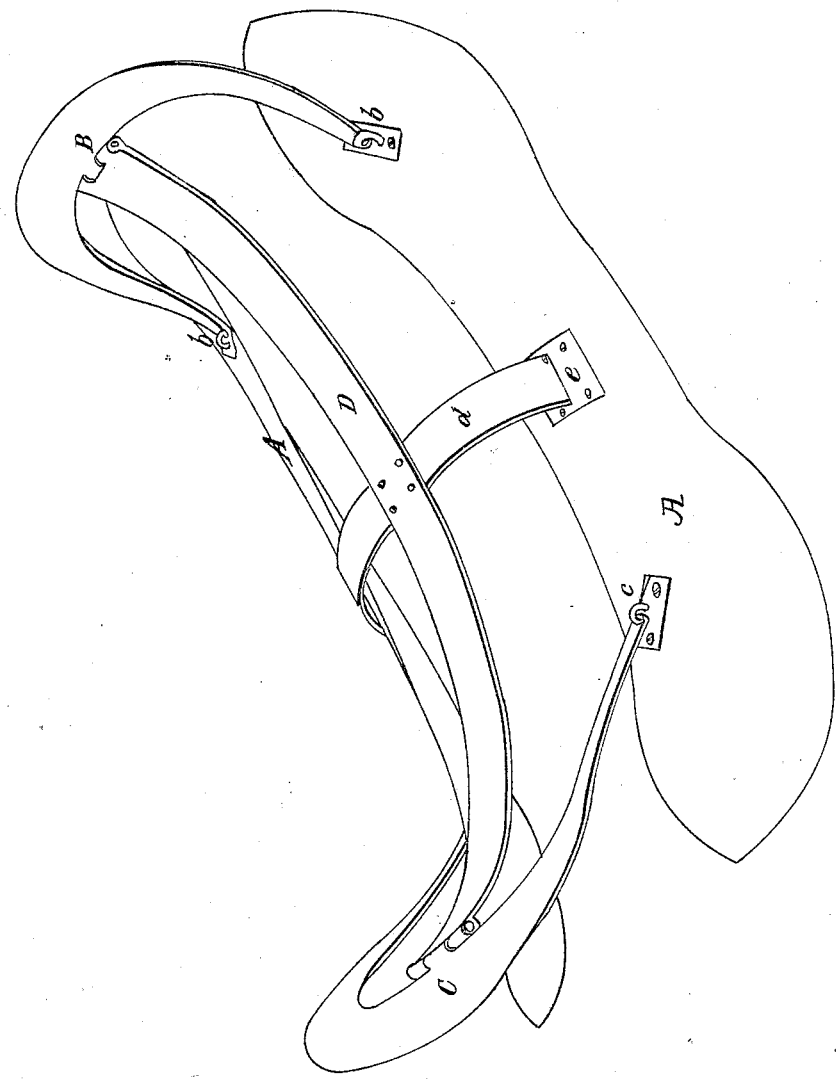

UNITED STATES PATENT OFFICE.

JOHN C. FR. SALOMON, OF CINCINNATI, OHIO.

SPRING-SADDLE.

Specification of Letters Patent No. 8,536, dated November 18, 1851.

*To all whom it may concern:*

Be it known that I, JOHN CHARLES FREDERICK SALOMON, of Cincinnati, in the county of Hamilton and State of Ohio, have invented a new and Improved Saddle-Tree, and do hereby declare that the following is a full and exact description thereof, reference being had to the annexed drawings, making a part of this specification.

The nature of my invention consists in making a saddle tree with a movable pommel and cantle which are connected with the pads by link joints and with each other by a spinal spring or springs and a rawhide covering forming the seat.

To enable others to make and use my invention, I will proceed to describe its construction and operation.

A are two pads of suitable shape to fit the part of the horse's back to which they are applied on either side of the vertebræ.

B is an arched cantle connecting the pads at one end by link joints $b$.

C is the pommel connecting the pads at the other end by similar link joints $c$.

D is an inverted arched spring or springs in direction of the spine secured to the pommel at one end, and the cantle at the other with joints and supported between them by one or more cross or rib springs $d$, resting on iron plates $e$ (on which they slide) let into the pads. The pommel and cantle are then connected with each other by a rawhide covering which forms the seat.

By this arrangement it will be seen that the weight on the rawhide seat tends to draw the pommel and cantle together, while the spinal spring D is thrusting them apart; which renders an easy spring seat to the rider; and the pads being connected with link joints to the pommel and cantle, adjust themselves to the back of any horse.

What I claim as my invention and desire to secure by Letters Patent is—

The movable pommel, the spinal spring or springs connecting the pommel and cantle, and the rawhide seat all combined substantially in the manner herein set forth, making a spring seat saddle tree.

In testimony whereof I have hereunto signed my name before two subscribing witnesses.

JOHN C. FR. SALOMON.

Witnesses:
   I. F. PRUCKNER,
   WM. M. SMITH.